(12) United States Patent
Powell et al.

(10) Patent No.: US 8,491,864 B2
(45) Date of Patent: *Jul. 23, 2013

(54) MANUFACTURE OF HIGH-STRENGTH, LOW-SALT SODIUM HYPOCHLORITE BLEACH

(75) Inventors: Duane J Powell, Alma, MI (US);
Robert B. Bebow, Alma, MI (US);
Brent J. Hardman, St. Louis, MI (US)

(73) Assignee: Powell Technologies LLC, St. Louis, MI (US)

( * ) Notice: Subject to any disclaimer, the term of this patent is extended or adjusted under 35 U.S.C. 154(b) by 753 days.

This patent is subject to a terminal disclaimer.

(21) Appl. No.: 11/648,411

(22) Filed: Dec. 29, 2006

(65) Prior Publication Data

US 2007/0110662 A1    May 17, 2007

Related U.S. Application Data

(63) Continuation-in-part of application No. 11/178,580, filed on Jul. 11, 2005, now Pat. No. 7,175,824.

(60) Provisional application No. 60/587,102, filed on Jul. 12, 2004.

(51) Int. Cl.
*C01B 11/06* (2006.01)

(52) U.S. Cl.
USPC .................. 423/473; 423/472; 252/187.26

(58) Field of Classification Search
USPC .................. 423/473, 472; 252/187.26
See application file for complete search history.

(56) References Cited

U.S. PATENT DOCUMENTS

| | | | | |
|---|---|---|---|---|
| 3,287,233 A * | 11/1966 | Aigueperse et al. | ...... | 252/187.26 |
| 4,330,521 A * | 5/1982 | Glineur | ........................ | 423/473 |
| 4,428,918 A * | 1/1984 | Verlaeten et al. | .............. | 423/473 |
| 4,780,303 A * | 10/1988 | Dugua | ........................... | 423/473 |
| 5,116,594 A * | 5/1992 | Hilliard et al. | ................ | 423/473 |
| 5,194,238 A * | 3/1993 | Duncan et al. | ................ | 423/473 |
| 5,961,879 A * | 10/1999 | Trigiante | .................. | 252/187.25 |

* cited by examiner

*Primary Examiner* — Ngoc-Yen Nguyen
(74) *Attorney, Agent, or Firm* — George L. Boller

(57) ABSTRACT

A method for continuous manufacture of higher-strength, lower-salt, aqueous sodium hypochlorite bleach from lower-strength aqueous sodium hypochlorite bleach that has some sodium hydroxide and that is essentially free of sodium chloride (salt) crystals, aqueous sodium hydroxide solution having a concentration by weight within a range from about 45% to about 51%, chlorine in gas and/or liquid phase that may or may not include inerts, and a recycle solution. Slurry is withdrawn from the tank at a level below where the lower-strength bleach, the sodium hydroxide solution, the chlorine, and the recycle solution begin to mix with slurry already in the tank. A first portion of the slurry is withdrawn and used as the recycle solution. A second portion of the slurry is withdrawn and processed to separate substantially all salt crystals from residual liquid that is recovered as the higher-strength lower-salt, aqueous sodium hypochlorite bleach.

16 Claims, 2 Drawing Sheets

_MANUFACTURE OF HIGH-STRENGTH, LOW-SALT SODIUM HYPOCHLORITE BLEACH_

REFERENCE TO RELATED APPLICATIONS AND PRIORITY CLAIMS

This application is a continuation-in-part of and claims the priority of non-provisional application Ser. No. 11/178,580, now U.S. Pat. No. 7,175,824 filed 11 Jul. 2005, in the names of DUANE J POWELL et al., which claims priority of Provisional Application No. 60/587,102, filed on 12 Jul. 2004 in the name of DUANE POWELL et al., the content of both prior applications being incorporated herein by reference.

FIELD OF THE INVENTION

This invention relates to the manufacture of sodium hypochlorite bleach, in particular a process and a plant for the manufacture of sodium hypochlorite bleach.

BACKGROUND OF THE INVENTION

Bleach (sodium hypochlorite) is a commodity chemical that is used in numerous applications. The basic chemistry for manufacturing bleach is a matter of common knowledge in the fields of chemistry and chemical engineering. Chlorine in gas and/or liquid phase is allowed to react with a solution of sodium hydroxide (caustic) to yield aqueous sodium hypochlorite. While that basic chemistry may be considered rather elementary, and essentially common to all processes for the commercial manufacture of bleach, specific processes that have been described in patent literature differ in significant ways.

Each of the various known processes for the commercial manufacture of bleach may be characterized as either a batch (discontinuous) production process or a continuous production process. Each type of process may have its own particular advantages.

A continuous process that is properly controlled is more likely to be performed with higher production efficiency than a corresponding batch process, and hence is likely to be more economical than a batch process. However, the specific manner in which a continuous process is performed plays a significant role in the nature and quality of the resulting bleach product.

U.S. Pat. Nos. 4,428,918 and 4,780,303 each describes a respective continuous process for manufacture of concentrated (i.e. high-strength) sodium hypochlorite solutions. Sodium chloride (salt) is however also a product of the basic reaction, and its removal from the aqueous sodium hypochlorite product can improve both the continuous process and the resulting product. Neither of those processes removes all of the salt from the resulting product.

Both patents recognize that certain batch processes can produce aqueous high-strength bleach from which significant amounts of salt have been removed.

It is believed that a continuous process that is capable of consistently producing aqueous high-strength bleach with low concentrations of both sodium chloride and sodium chlorate with residual slight excess caustic would be beneficial to industry. A product that has even greater strength, and lower salt and chlorate concentrations, than those mentioned in U.S. Pat. Nos. 4,428,918 and 4,780,303 would be especially beneficial. The benefits reside both in the utility of the product and relevant economic factors.

The process that is the subject of the inventors' priority provisional and non-provisional patent applications initially creates, and then continuously replenishes, a salt slurry in a bottom zone of a crystallizer stage tank. As fresh solutions of bleach and caustic continuously enter into solution in the tank, the slurry at the bottom is being continuously pumped out.

A first portion of the withdrawn slurry forms a recycle solution that is cooled during passage through a heat exchanger before being fed back into the tank. The fresh caustic is entrained with the recycle solution ahead of the heat exchanger. Fresh bleach is entrained with the entrained caustic and recycle solution after the heat exchanger.

The crystallizer stage tank shown in the priority patent applications comprises a skirt baffle that is inside the cylindrical sidewall of the tank and forms a cylindrical wall to create an annular calming zone between the skirt baffle and the tank sidewall. The annular calming zone is essentially free of turbulence, especially toward the top where an upper zone of essentially crystal-free mother liquor is created. The skirt baffle surrounds a central inner zone into which the fresh bleach and caustic and the recycle solution are introduced. The annular calming zone and the central inner zone are both above and open to the bottom zone.

Continually overflowing mother liquor at an appropriate rate from the top of the calming zone supersaturates the solution resulting in salt continuously precipitating out of solution with the salt crystals continuously replenishing the slurry in the bottom zone.

SUMMARY OF THE INVENTION

The present invention, in one respect, relates to a discovery for simplifying the equipment and process that are the subject of the priority patent applications.

The higher-strength, lower-salt bleach produced by the inventive process and apparatus has strength like that of the bleach manufactured by the process that is the subject of the priority patent applications. That bleach, when diluted to a lower strength comparable with typical domestic commercial bleaches has improved stability, and hence extended half-life when compared to such bleaches.

The continuous process of the present invention is conducted in a crystallizer tank without continuously drawing off mother liquor at the top of a calming zone. That allows the tank to not have a skirt baffle that otherwise would divide the portion of the tank above the bottom zone into a central inner zone surrounded by an outer calming zone.

The higher-strength, lower-salt bleach products that can be manufactured in accordance with principles of the present invention are those which comprise an aqueous solution of greater than 25% by weight sodium hypochlorite and a ratio, on a % weight basis, of NaCl (salt) to NaOCl (sodium hypochlorite), less than substantially 0.38, with a slight excess of sodium hydroxide (caustic). After removal of solids, a bleach having approximately 30% to approximately 35% by weight sodium hypochlorite and a NaCl/NaOCl ratio of about 0.21 to about 0.25 at 30% strength and about 0.10 to about 0.15% at 35% strength, with slight excess caustic, is one example of such a higher-strength, lower-salt bleach product.

A solution of the fresh caustic, the fresh lower-strength bleach that is essentially free of salt crystals, and salt slurry withdrawn from the bottom zone of the tank to form the recycle solution are continuously introduced into the crystallizer tank. The solution in the tank is chlorinated by introducing chlorine in liquid and/or gas phase, wet or dry, with or without inerts. The percentage of excess caustic in solution is controlled in any suitable manner using an appropriate measurement, such as oxidation-reduction potential measurement, by commercially available equipment.

A heat exchanger associated with the crystallizer tank removes heats of solution and reaction from slurry that is withdrawn from the tank to form the recycle solution. By using a high recycle rate through the heat exchanger, the temperature drop between the recycle outlet from the tank and the recycle return to the tank can be kept small, a benefit that aids crystal formation while avoiding fouling of the heat exchanger. The use of a high recycle rate for keeping that temperature drop small is a related aspect of the invention. A temperature drop within a range from about 1° F. to about 4° F. would be typical, with a range from about 1° F. to about 2° F. being most preferable.

In order to control the temperature drop to within such a range, the heat exchanger is one that has sufficient heat transfer surface area in relation to the flow rates of the respective liquids passing through it and that presents low restriction to the flows. By suitable control of chemical processes in the crystallizer stage, the temperature of those processes can be kept within a range that allows cooling tower water to be used as the cooling liquid in certain types of heat exchangers, a further related aspect of the invention that avoids the need to use more expensive refrigerated water. Principles of the invention do however also contemplate the use of refrigerated or chilled water for certain other types of heat exchangers.

A further related aspect of the invention involves controlling the temperature difference between the recycle solution and the cooling liquid passing through the heat exchanger. A target range of temperature differences that avoid fouling of the heat exchanger depends on the design of the particular heat exchanger. For a plate and frame type heat exchanger, the temperature difference may have a range of from about 2° F. to about 3° F. The temperature difference may have a larger range, 5° F.-15° F. for example, for other heat exchangers, such as a shell and tube type.

The fresh caustic is preferably added to the recycle solution ahead of the heat exchanger. The caustic is itself preferably cooled by passage through its own heat exchanger before being added to the recycle solution. The fresh lower-strength bleach is added to entrain with the entrained caustic and recycle solution after the latter have been cooled.

With the process continuously running, the continuous introduction of chlorine and the mixture of recycle solution, caustic, and lower-strength bleach sustains a continuous reaction in the tank to produce higher-strength bleach. The mixture of recycle solution, fresh caustic, and fresh lower-strength bleach, is introduced into solution already in the tank at a level above a bottom zone from which the recycle solution is being withdrawn. The chlorine is also introduced above the bottom zone, and above the level at which the liquid mixture is being introduced.

The level to which solution fills in the tank is controlled, or regulated, in any suitable manner, by process control apparatus. No solution overflows the tank or is withdrawn from the tank at a level above the bottom zone. Solution that is withdrawn from the bottom zone as a slurry becomes either recycle solution returned to the tank or is subsequently processed to yield the final higher-strength, lower-salt bleach product. In the absence of a distinct calming zone in the crystallizer tank as described in the priority patent applications, the solution in the tank is generally homogeneous, especially in the bottom zone.

Process control conditions for the process of the present invention can create sufficiently large crystal sizes for effective removal of crystals by mechanical processes. The resulting distribution of salt crystal sizes in the slurry renders them well-suited for ultimate recovery as essentially dry solids, a still further related aspect of the invention.

The withdrawn slurry that contains the higher-strength bleach product from which the further mechanical processing removes salt crystals is continually introduced into a pre-thickening tank where the slurry is mechanically agitated, either by a mixer and/or by air under pressure blowing through it. At the same time, slurry is being continually pumped from the pre-thickening tank to a pre-thickening device such as a hydrocyclone that removes more liquid, or filtrate. This filtrate from the pre-thickening device is introduced into a product tank for holding the filtrate as the higher-strength lower-salt bleach product while the more fully thickened slurry from the pre-thickening device is fed into a centrifuge.

The centrifuge removes almost all of the remaining liquid, yielding a product that at a minimum is about 96% salt, with the remainder liquid and minor amounts of trace chemicals that include bleach.

A preferred centrifuge is a two-stage centrifuge that allows the product to be washed with water for removing residual hypochlorite from the final salt product. Filtrate from the first stage of the centrifuge is returned to the crystallizer tank. Overflow of filtrate from the product tank is returned to the pre-thickening tank.

The high-strength, low-salt bleach product produced by the inventive process has a bleach strength greater than 25% by weight. The specific strength of a particular bleach product may be limited by decomposition issues during the production process and size of salt crystals precipitated, especially as bleach strength nears its upper limit, which as a practical matter is about 35%.

A generic aspect of the invention relates to a method for the continuous manufacture of higher-strength, lower-salt, aqueous sodium hypochlorite bleach from lower-strength aqueous sodium hypochlorite bleach that has some sodium hydroxide and that is essentially free of sodium chloride (salt) crystals.

The method comprises A) in a tank, sustaining a continuous reaction that produces a slurry of higher-strength bleach and solid salt crystals by introducing into the tank 1) the lower-strength aqueous sodium hypochlorite bleach that has some sodium hydroxide and is essentially free of salt crystals, 2) aqueous sodium hydroxide solution having a concentration by weight within a range from about 45% to about 51%, and 3) chlorine in gas and/or liquid phase that may or may not include inerts, and 4) a recycle solution; B) continuously withdrawing slurry from the tank at a level below where the lower-strength bleach, the sodium hydroxide solution, the chlorine, and the recycle solution begin to mix with slurry already in the tank; C) cooling a first portion of the withdrawn slurry and using the cooled first portion of the withdrawn slurry as the recycle solution; and D) processing a second portion of the withdrawn slurry to separate substantially all salt crystals from the residual liquid; and E) recovering the residual liquid as the higher-strength lower-salt, aqueous sodium hypochlorite bleach.

BRIEF DESCRIPTION OF THE DRAWINGS ILLUSTRATING PRACTICE OF THE INVENTIVE PROCESS

DESCRIPTION OF THE INVENTIVE PROCESS AND EQUIPMENT

Figure 1:
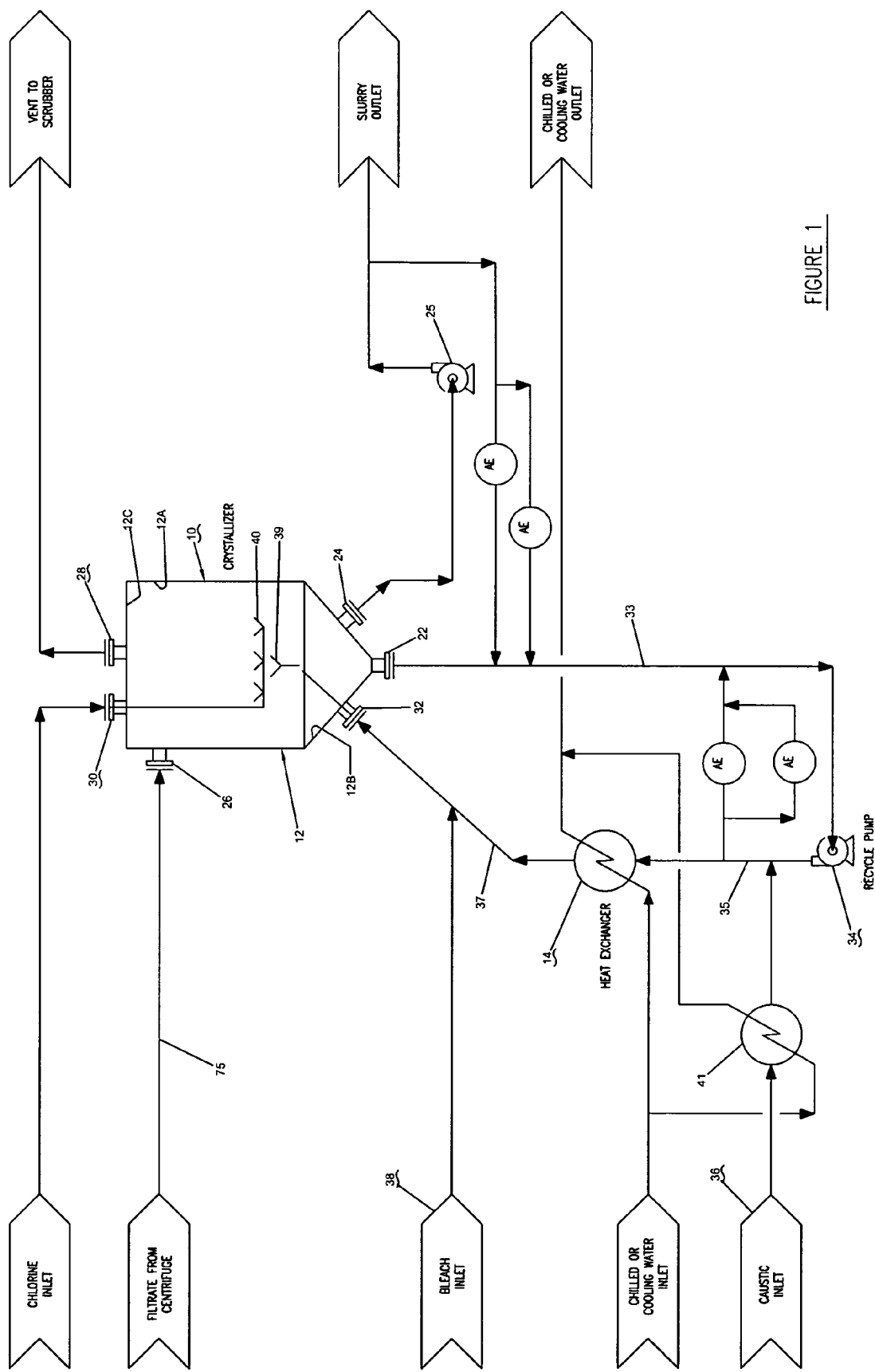
FIG. 1 illustrates schematically an example of a crystallizer stage for practicing the invention.

The stage shown in FIG. 1 comprises a crystallizer 10 that comprises a tank 12 with which a heat exchanger 14 is associated, as described above. The drawing does not show a first stage like the one described in the priority applications for making the lower-strength bleach. It is to be appreciated that the lower-strength bleach that is introduced into tank 12 could have been manufactured elsewhere by any suitable process. Tank 12 comprises a cylindrical sidewall 12A, a conical bottom wall 12B, and a top wall 12C.

This crystallizer stage has various inlets to and outlets from tank 12. A recycle outlet 22 is at or near the center low point of conical bottom wall 12B. A slurry outlet 24 is in the conical bottom wall 12B at a level above that of outlet 22. Precise locations for the two outlets 22, 24 are generally not critical provided that they are open to a bottom zone of the solution in tank 12 where slurry collects. An outlet may even be at an end of a pipe that penetrates and extends into the interior of the tank beyond the tank wall. The outlets may have a common opening to the slurry, for example the outlet 24 teeing into a conduit 33 extending from outlet 22 instead of being at wall 12B.

The tank has a filtrate inlet 26 that allows filtrate delivered through a conduit 75 from a centrifuge that will be described later with reference to FIG. 2 to be introduced into tank 12. A vent outlet 28 provides an escape for any residual chlorine gases and inert gases to a standard commercial chlorine scrubber (not specifically shown).

Two other inlets to tank 12 are a chlorine inlet 30 and a recycle inlet 32. A recycle pump 34 draws slurry from the bottom of the tank through outlet 22 and a conduit 33 that leads to the suction side of the pump. The pump pumps the liquid through a conduit 35 leading from the pump outlet to heat exchanger 14. Fresh caustic introduced through a caustic inlet 36, and preferably cooled by first passing through a heat exchanger 41 after entering the caustic inlet, is added to the recycle solution being pumped through conduit 35 at a location between pump 34 and heat exchanger 14. Lower-strength bleach is added through a bleach inlet 38 to a conduit 37 that extends from heat exchanger 14 to recycle inlet 32. Although the illustrated apparatus shows the tank having a single inlet through which a mixture of bleach, fresh caustic and recycle solution are introduced, other plumbing arrangements may be used for introducing the various solutions into tank 12.

The entrained solutions of fresh caustic, fresh lower-strength bleach and recycle slurry, are introduced into tank 12 through recycle inlet 32. The actual location at which the entrained solutions enter into solution already in the tank is at any suitable location that does not significantly disrupt the accumulation of slurry at the bottom of tank 12 and withdrawal of accumulated, substantially homogeneous slurry from the bottom zone of the tank. The drawing shows a preferred central location above the bottom zone, where the entrained solutions entering through inlet 32 are conveyed through a conduit leading to an upright funnel 39 that has an increasing diameter for promoting good distribution of the entrained solutions as they begin to mix with solution already in the tank.

Chlorine passing into tank 12 through inlet 30 is conveyed through a conduit to a distribution system 40 arranged to direct chlorine into the solution in the tank to chlorinate the caustic. Outlet openings in distribution system 40 are directed downward to avoid potential clogging. They are disposed at a level that allows the gas or liquid pressure of the chlorine, depending on the state in which the chlorine is introduced, to be the force that moves the chlorine through the outlet openings in distribution system 40.

Without the baffle skirt that is present in the crystallizer tank shown in the priority patent applications, no calming zone is created, and consequently neither is any mother liquor zone created in the solution in tank 12 behind the baffle skirt. The locations at which the reactants begin to mix with slurry already in the tank is at a central location that is not obstructed from the sidewall of the tank, unlike in the priority patent applications where the baffle skirt presents an intentional obstruction to the sidewall for creating the calming zone.

As will be further explained in more detail later, the high-strength, lower-salt bleach product resulting from the continuous process of the present invention is obtained by drawing slurry from tank 12 through outlet 24 by pumping it out via a pump 25 for subsequent processing in accordance with FIG. 2.

The rate of heat liberated by chemical Processes occurring in crystallizer 10 is a function of the throughput through the crystallizer. Consequently, the recycle rate and the cooling liquid rate through the heat exchanger are controlled in relation to the crystallizer throughput so as to maintain both the small temperature drop in the recycle solution as it passes through the heat exchanger and a temperature difference between the recycle solution and the cooling liquid appropriate for the particular type of heat exchanger used, as mentioned above. It is in that context that the process is said to have a high recycle rate. FIG. 1 also shows some process control equipment in the form of redundant sensor pairs AE disposed in respective flow loops from the outlets of pumps 25 and 34 to the suction side of pump 34. The sensors monitor chlorination to assure compliance with control limits. Service valves (not shown) can shut off flow through either Sensor of a pair to allow its replacement without shutting down the process.

Figure 2:
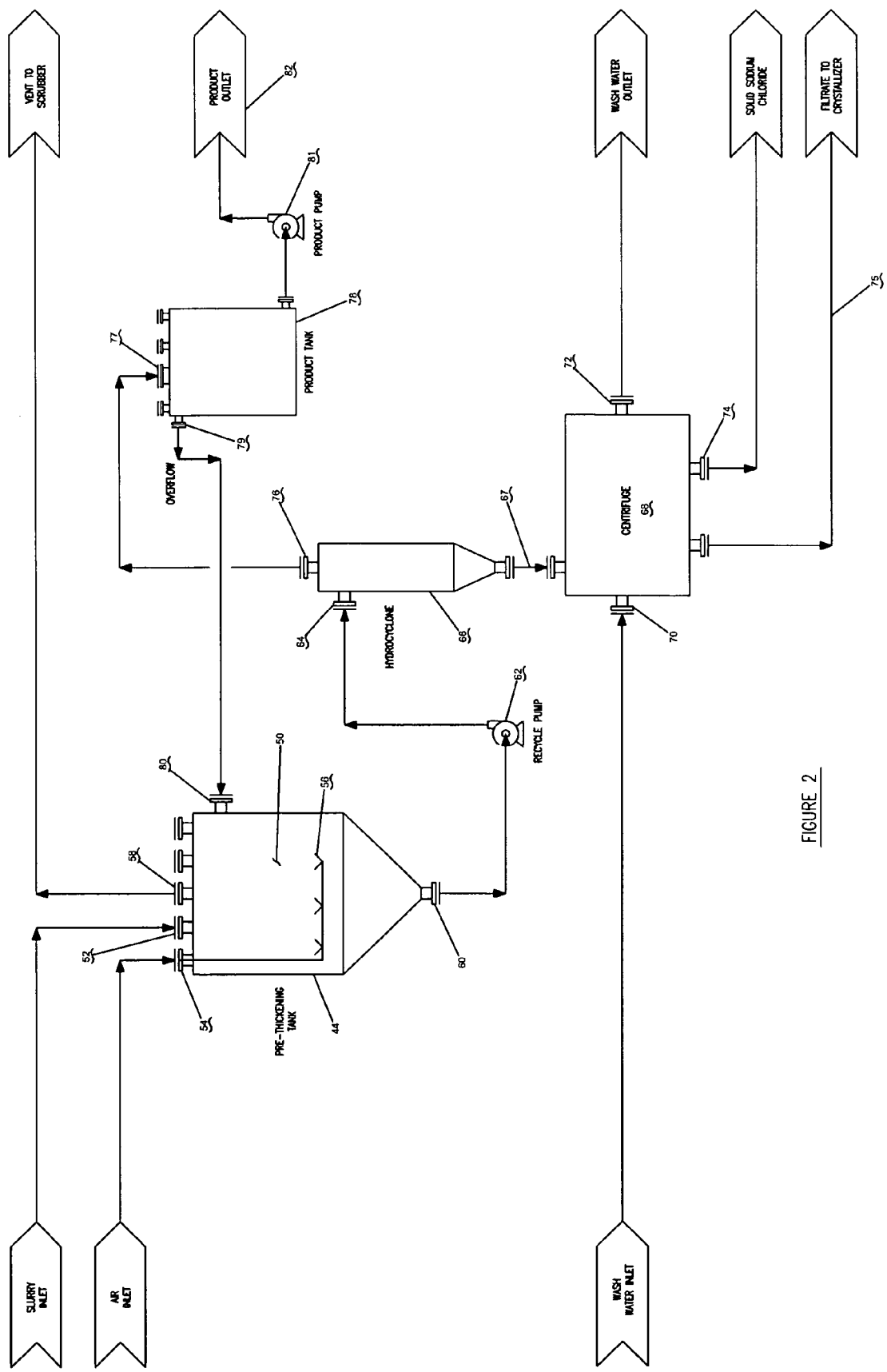
FIG. 2 illustrates schematically an example of processing subsequent to the crystallizer stage.

FIG. 2 shows additional equipment that includes a pre-thickening tank 44 that is similar to tank 12 in that it has a sidewall, a conical bottom wall, and a top wall. Slurry from tank 12 is introduced through a slurry inlet 52 and falls downward toward a zone 50 of slurry already in the tank. The slurry within zone 50 is agitated in any suitable way, for example, by the use of air sparging as illustrated. Air under pressure is supplied through an air inlet 54 to a distribution system 56 that is arranged to direct the air upward through slurry in zone 50. The air and any entrained gases leaving the slurry are vented through a vent outlet 58 in the top wall leading to a scrubber (not specifically shown). A mechanical agitator may be used in lieu of, or in conjunction with, the air sparging.

A recycle pump 62 pumps slurry from a location at or near the bottom of zone 50 out of tank 44 through a slurry outlet 60. The particular outlet shown is at the low point of the conical bottom tank wall. The pumped slurry is conveyed to an inlet 64 of a hydrocyclone 66 that operates to separate liquid from the slurry, significantly increasing the thickness of the slurry that is discharged from hydrocyclone 66 through a conduit 67 leading to a centrifuge 68 that is used for recovery of crystallized salt by centrifuging the thickened slurry.

A preferred centrifuge is a two-stage centrifuge that allows the salt to be washed between centrifuging stages during the recovery process. The thickened slurry from hydrocyclone 66 is first centrifuged in a first stage of centrifuge 68 to remove a large percentage of liquid and leave solids having small liquid content. The solids are then washed and subsequently centrifuged in a second stage of the centrifuge. Water is an example of one fluid that may be used for washing. Hence FIG. 2 shows a wash water inlet 70 and a wash water outlet 72. Washing the solids removes significant amounts of residual chemicals, such as hypochlorite, from the final salt product that is delivered from the centrifuge at a solids outlet 74. Filtrate from the first stage of centrifuge 68 is returned through conduit 75 to crystallizer tank 12 (see FIG. 1 again), and the liquid that is separated from the slurry by hydrocyclone 66 becomes filtrate that is delivered through an outlet 76 from the hydrocyclone to an inlet 77 of a product tank 78 where the filtrate is collected as the higher-strength, lower-salt bleach product of the process.

The aqueous bleach product is pumped out of tank 78 by a pump 81 and delivered through a product outlet 82 for further use on-site in other processes and/or transport to an on-site or off-site location for bulk shipment and/or packaging preparatory to shipment.

Any product overflow from tank 78 is returned to an inlet 80 of tank 44 through an outlet 79 of tank 78.

The bleach product in tank 78 will contain some amount of sodium chlorate. That amount is to some extent a function of the reaction temperature. In general a lower reaction temperature will result in lower chlorate concentration. Consequently, certain principles of the inventive process apply to plants that use refrigerated water, as opposed to cooling tower water, in order to enable the reaction temperature to be lower. On the other hand, the high-strength of the bleach product produced by the inventive process allows for its dilution by the addition of water, and while that will necessarily reduce bleach strength, it will be also effective in reducing chlorate concentration.

Potassium hydroxide can be substituted for sodium hydroxide to produce potassium hypochlorite in a similar manner.

While a presently preferred embodiment of the invention has been illustrated and described, it should be appreciated that principles of the invention are applicable to all embodiments that fall within the scope of the claims that follow hereinafter.

What is claimed is:

1. A method for the continuous manufacture of higher-strength, lower-salt, aqueous sodium hypochlorite bleach from lower-strength aqueous sodium hypochlorite bleach that has some sodium hydroxide and that is essentially free of sodium chloride (salt) crystals, the method comprising:
   A) in a tank that has a bottom wall and a sidewall extending upward from the bottom wall to bound an interior of the tank, sustaining a continuous reaction that produces a slurry of higher-strength bleach and solid salt crystals by introducing into the tank interior in a generally upward direction
      a solution comprising a mixture of the lower-strength aqueous sodium hypochlorite bleach that has some sodium hydroxide and is essentially free of salt crystals, aqueous sodium hydroxide solution having a concentration by weight within a range from about 45% to about 51%, and a recycle solution,
      and introducing into the tank interior chlorine in gas and/or liquid phase that may or may not include inerts, so that the mixture and chlorine begin to mix with slurry already in the tank at a level above the bottom wall of the tank;
   B) continuously withdrawing slurry from the tank at a level below the location where the mixture and the chlorine begin to mix with slurry already in the tank;
   C) cooling a first portion of the withdrawn slurry and using the cooled first portion as the recycle solution;
   D) processing a second portion of the withdrawn slurry to separate substantially all salt crystals from the residual liquid; and
   E) recovering the residual liquid as the higher-strength lower-salt, aqueous sodium hypochlorite bleach.

2. A method as set forth in claim 1 wherein cooling of the first portion of withdrawn slurry comprises flowing the first portion of withdrawn slurry through a heat exchanger.

3. A method as set forth in claim 2 wherein the heat exchanger functions to transfer heat from the withdrawn slurry to liquid coolant flowing through the heat exchanger at a temperature difference between liquid coolant and slurry controlled to a range extending from about 5° F. to about 15° F.

4. A method as set forth in claim 3 wherein the temperature difference is controlled to a range extending from about 2° F. to about 3° F.

5. A method as set forth in claim 2 wherein the cooling provided by the heat exchanger is controlled so as to cause the temperature of the slurry to lose from about 1° F. to about 4° F., and preferably about 1° F. to about 2° F., during passage through the heat exchanger.

6. A method as set forth in claim 2 wherein the temperature of the first portion of withdrawn slurry allows the use of cooling tower water for cooling the slurry, and the heat exchanger functions to transfer heat from the first portion of the withdrawn slurry to cooling tower water flowing through the heat exchanger.

7. A method as set forth in claim 2 wherein the heat exchanger functions to transfer heat from the withdrawn slurry to refrigerated water flowing through the heat exchanger.

8. A method for the continuous manufacture of higher-strength, lower-salt, aqueous sodium hypochlorite bleach from lower-strength aqueous sodium hypochlorite bleach that has some sodium hydroxide and that is essentially free of sodium chloride (salt) crystals, the method comprising:
   A) introducing i) a mixture of the lower-strength aqueous sodium hypochlorite bleach that has some sodium hydroxide and is essentially free of salt crystals, aqueous sodium hydroxide solution having a concentration by weight within a range from about 45% to about 51%, and a recycle solution and ii) chlorine in gas and/or liquid phase that may or may not include inerts into a tank having a bottom wall and an upright sidewall cooperatively defining an interior of the tank to sustain a continuous reaction that produces a slurry of higher-strength bleach and solid salt crystals in the tank interior;
   B) creating the recycle solution by continuously withdrawing slurry from the tank interior;
   C) creating the higher-strength, lower-salt, aqueous sodium hypochlorite bleach by continuously withdrawing slurry from the tank interior at a level vertically below locations where the mixture and the chlorine are introduced into the tank interior, and separating out substantially all salt crystals, and recovering residual liquid as the higher-strength lower-salt, aqueous sodium hypochlorite bleach.

9. A method for the continuous manufacture of higher-strength, lower-salt, aqueous sodium hypochlorite bleach from lower-strength aqueous sodium hypochlorite bleach that has some sodium hydroxide and that is essentially free of sodium chloride (salt) crystals, the method comprising:
   A) introducing i) a mixture of the lower-strength aqueous sodium hypochlorite bleach that has some sodium hydroxide and is essentially free of salt crystals, aqueous sodium hydroxide solution having a concentration by weight within a range from about 45% to about 51%, and a recycle solution and ii) chlorine in gas and/or liquid phase that may or may not include inerts into a tank having a bottom wall and an upright sidewall cooperatively defining an interior of the tank to sustain a continuous reaction that produces a slurry of higher-strength bleach and solid salt crystals in the tank interior;

B) creating the recycle solution by continuously withdrawing slurry from the tank interior;

C) creating the higher-strength, lower-salt, aqueous sodium hypochlorite bleach by continuously withdrawing slurry from the tank interior at a level vertically below locations where the mixture and the chlorine are introduced into the tank interior, and separating out substantially all salt crystals, and recovering residual liquid as the higher-strength lower-salt, aqueous sodium hypochlorite bleach;

wherein the step of introducing i) the mixture of lower-strength aqueous sodium hypochlorite bleach that has some sodium hydroxide and is essentially free of salt crystals, aqueous sodium hydroxide solution having a concentration by weight within a range from about 45% to about 51%, and recycle solution and ii) chlorine in gas and/or liquid phase that may or may not include inerts into a tank having a bottom wall and an upright sidewall cooperatively defining an interior of the tank to sustain a continuous reaction that produces a slurry of higher-strength bleach and solid salt crystals in the tank interior comprises introducing the mixture into the tank at a location that is generally central, and not obstructed, to the sidewall.

10. A method as set forth in claim 9 wherein the step of creating the recycle solution comprises continuously withdrawing slurry from the tank interior at a level vertically below the locations where the mixture and the chlorine are introduced into the tank interior.

11. A method as set forth in claim 10 wherein the step of creating the recycle solution comprises cooling the slurry in a heat exchanger.

12. A method as set forth in claim 11 wherein the heat exchanger functions to transfer heat from the slurry to liquid coolant flowing through the heat exchanger at a temperature difference between liquid coolant and slurry controlled to a range extending from about 5° F. to about 15° F.

13. A method as set forth in claim 12 wherein the temperature difference is controlled to a range extending from about 2° F. to about 3° F.

14. A method as set forth in claim 11 wherein the cooling provided by the heat exchanger is controlled so as to cause the temperature of the slurry to lose from about 1° F. to about 4° F., and preferably about 1° F. to about 2° F., during passage through the heat exchanger.

15. A method as set forth in claim 11 wherein the step of cooling the slurry in a heat exchanger comprises transferring heat from the slurry to cooling tower water flowing through the heat exchanger.

16. A method as set forth in claim 11 wherein the step of cooling the slurry in a heat exchanger comprises transferring heat from the slurry to refrigerated water flowing through the heat exchanger.

* * * * *